(12) United States Patent
Semann

(10) Patent No.: US 10,864,624 B2
(45) Date of Patent: Dec. 15, 2020

(54) DEVICE FOR ANGULARLY PRECISE MACHINING OF A WORKPIECE BY A TOOL GUIDED ON A GUIDE RAIL

(71) Applicant: Mika Semann, Unterhaching (DE)

(72) Inventor: Mika Semann, Unterhaching (DE)

( * ) Notice: Subject to any disclaimer, the term of this patent is extended or adjusted under 35 U.S.C. 154(b) by 50 days.

(21) Appl. No.: 14/767,216

(22) PCT Filed: Feb. 10, 2014

(86) PCT No.: PCT/DE2014/000051
§ 371 (c)(1),
(2) Date: Aug. 11, 2015

(87) PCT Pub. No.: WO2014/124625
PCT Pub. Date: Aug. 21, 2014

(65) Prior Publication Data
US 2015/0375389 A1    Dec. 31, 2015

(30) Foreign Application Priority Data

Feb. 12, 2013   (DE) .................. 10 2013 002 879

(51) Int. Cl.
*B25H 1/00*       (2006.01)
*B27B 27/08*      (2006.01)
*B23D 47/02*      (2006.01)

(52) U.S. Cl.
CPC ......... *B25H 1/0078* (2013.01); *B23D 47/025* (2013.01); *B27B 27/08* (2013.01)

(58) Field of Classification Search
CPC ...... B25H 1/0078; B23D 47/025; B27B 27/08
See application file for complete search history.

(56) References Cited

U.S. PATENT DOCUMENTS

| | | | | |
|---|---|---|---|---|
| 1,308,451 A | * | 7/1919 | Schachat | B23Q 16/007 269/10 |
| 2,367,582 A | * | 1/1945 | Honyoust | B23B 47/28 269/8 |

(Continued)

*Primary Examiner* — David P Bryant
*Assistant Examiner* — Nirvana Deonauth

(57) ABSTRACT

Disclosed is a device for angularly precise machining of a workpiece (9) by a tool (3) guided on a guide rail (2), wherein the tool may be, in particular, an electrically-operated hand tool such as a router or circular saw, etc., consisting of a one- or two-piece working panel (1), wherein the working panel (1) of the device is provided with a plurality of receptacles (4), which are arranged in suitable relation to each other and which serve to receive positioning devices (8) without play and perpendicularly to the working panel (1) such that, on one side, a workpiece (9) and, on the other side, a guide rail (2) for guiding a tool (3) can be positioned on or fixed to the working panel such that a defined and reproducible machining angle (11) forms between the face of the workpiece (9) to be processed, which rests against the positioning devices (8), and the guide rail (2), which is placed upon the workpiece (9) to be machined in order to guide the tool (3), which machining angle can be varied by re-inserting at least one of the positioning devices (8) into one of the receptacles (4) and/or by using positioning devices (8) of differently sized cross-sections, wherein the cross-section may be circular or even non-circular, wherein intermediate angles or "crooked" angular value can also be repeatedly set for machining by positioning devices (8), which are rotatable, non-circular in shape or eccentrically mounted, and may be fixed in their rotation.

19 Claims, 4 Drawing Sheets

(56) References Cited

U.S. PATENT DOCUMENTS

Figure 1:
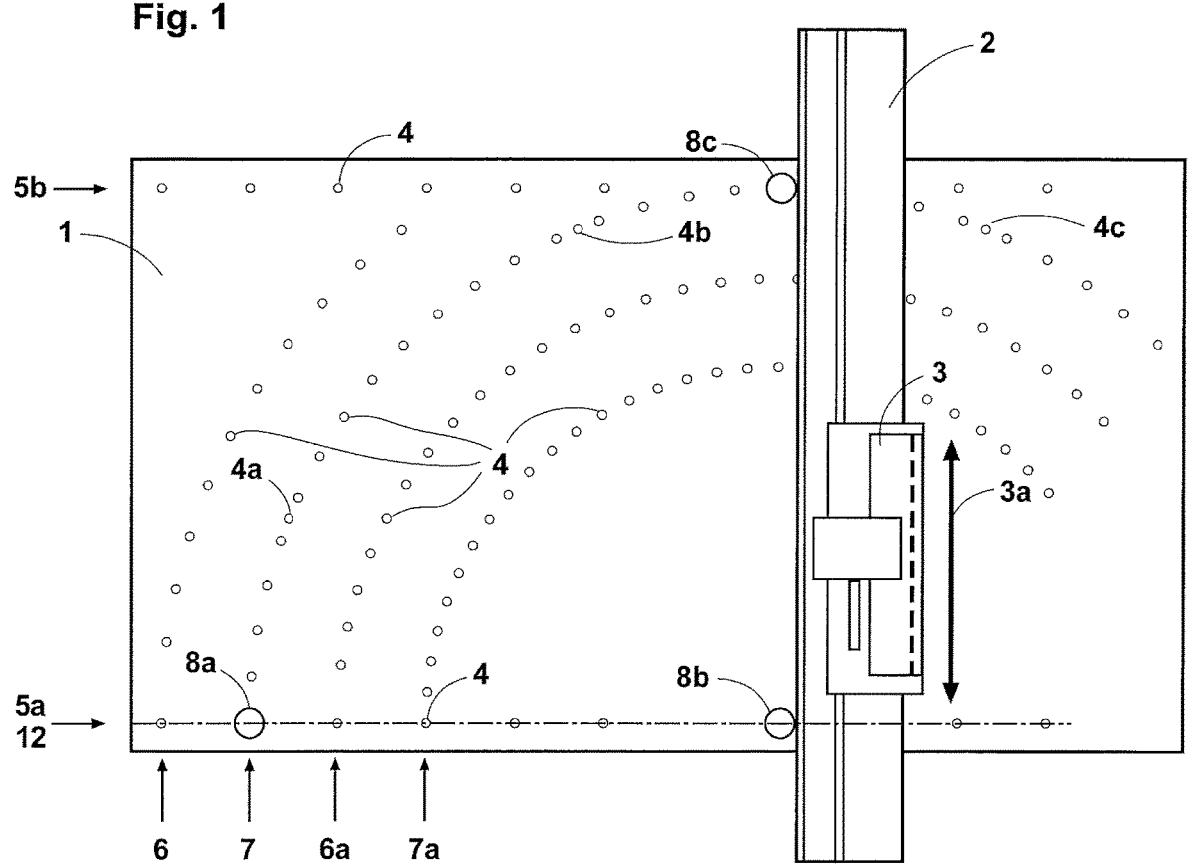

| | | | | | |
|---|---|---|---|---|---|
| 3,463,479 | A | * | 8/1969 | Hennessey | B23Q 3/103 269/271 |
| 4,805,887 | A | * | 2/1989 | Ray | G01B 5/0004 269/21 |
| 5,064,321 | A | * | 11/1991 | Barnes | B23Q 3/103 269/303 |
| 5,901,763 | A | * | 5/1999 | You | B23D 47/025 144/286.1 |
| 5,941,700 | A | * | 8/1999 | Fuchs | A61C 13/20 269/266 |
| 6,524,033 | B1 | * | 2/2003 | Sykes | B23B 47/287 408/1 R |
| 6,702,269 | B1 | * | 3/2004 | Tadich | B27F 7/155 269/304 |
| 7,421,798 | B2 | * | 9/2008 | Pattee | B23Q 9/005 33/534 |
| 2002/0140149 | A1 | * | 10/2002 | Kimble | B25B 11/005 269/21 |
| 2006/0090623 | A1 | * | 5/2006 | Diener | B23D 53/04 83/651 |
| 2013/0239401 | A1 | * | 9/2013 | Masakawa | B23Q 3/088 29/559 |

* cited by examiner

DEVICE FOR ANGULARLY PRECISE MACHINING OF A WORKPIECE BY A TOOL GUIDED ON A GUIDE RAIL

The present invention relates to the technical field of work benches and mobile/stationary workshop equipment, preferably in the range of processing wooden sheet materials.

Systems which allow to guide tools along a straight over a workpiece—further referred to herein as a "guide rail"— are commercially available are therefore not further described herein. A corresponding system, for example, is evident from the Patent DE 3243564 C2. A device in which a rail-like tool guide can be adjusted angularly on a countertop is known for example, from the patent application DE 197 56 661 A1. The patent US 2011/0101589 A1 describes a device in which vertical spacer for supporting a workpiece can be mounted in a base plate, containing holes which are arranged in a regularly manner.

Commercially available systems for processing sheet-like materials by hand tools and among them especially those that address mobile applications or use in small workshops, are usually characterized in that they use design principles of large machines equipment, such as those used in carpentry, etc., however often use significantly smaller dimensions. Possibly because of the requirements for size, weight and design effort, the individual components of these devices and in particular those which serve to guide or position the tool or the workpiece, are usually not very stiff or/and precise manufactured. The resulting inaccuracies therefrom which can also sum-up disadvantageously often prevent that with such devices high absolute and repeat accuracies can be achieved. In particular accuracies as they are achievable with the aforementioned large-scale equipment are generally not feasible. This concerns in particular the angular accuracy which shall be understood as the angle between on side of the workpiece and the working direction of the tool as "set" on the machine. One reason for this is often that even small angle inaccuracies or tolerance, for example, within a small dimensioned miter fence, tend to lead to a high absolute deviation in a greater distance from the fence. Furthermore, these systems typically offer only very few defined, locking positions for example at 22.5-45-67.5 and 90 degrees. Other machining angles must then be achieved by dialing in the appropriate angle manually which in turn often leads to inaccuracies since the appropriate scale is often quite small and reading errors or inaccuracies can occur easily. Higher repeat accuracies can also not be reached because as with each new manual setting the angle again is naturally slightly different.

The described effects are also independent of whether the tool is guided over the workpiece or the workpiece is guided over the tool. In systems which are build on the usage of a guide rail it is often so that the achievable angle accuracy is even worse as if the guide rail is placed manually i.e. "free hand" on the workpiece according to markings made on the workpiece.

The present invention is therefore based on the objective to provide a device which on the one hand can be build with low constructive effort and on the other hand allows to achieve repeatable a maximum angle accuracy between one side of the workpiece and the moving direction of the tool e.g. the cutting line of a circular saw.

The objective is achieved by the features specified in claim 1, i.e. a device for the machining of a workpiece (9) by a tool (3) which can be in particular an electrically operated hand tool such as a router, circular saw, etc., guided on a guide rail (2), under a precise and definite angle (11) consisting of a work plate (1) made from one or two pieces and positioning devices (8), characterized in that the work plate (1) contains a variety of holes (4) which are located in an appropriate relation to each other allowing to mount positioning devices (8) to the work plate (1) free of play and rectangular to it and in a way that allows to have a workpiece (9) and a guide rail (2) for guiding a tool (3) positioned or/and fixed on them in such a way that a definite and reproducible angle (11) between that side (10) of the workpiece (9) that is positioned at the positioning devices (8) and the guide rail (2) is established which can be varied by relocating at least one of the positioning devices (8) into another hole (4) or/and by using positioning devices (8) of different diameter, whereas their cross-section can be round or out-of-round while allowing to define intermediate angles (11) repeatable through rotatable positioning devices which can be fixed in their rotation and are out-of-round shaped or mounted eccentrically.

A basic idea of the invention is that the work plate on which the workpiece rests, simultaneously works both as a work surface as well as—to a certain extent oversized— miter fence containing a variety of "locking positions" so that inaccuracies (e.g. play, reading inaccuracies etc.) can not be enlarged via a lever arm of a—compared to a conventionally dimensioned miter fence—large workpiece Another basic principle of the invention is to circumvent the problem of low stiffness smaller cross sections, as they frequently appear with appropriate parts like miter fences by the usage of the work plate which shows very high stiffness and the the workpiece as well as the guide rail can be positioned on the positioning devices free-of-play so that no inaccuracies based on a lack of stiffness or play can occur.

By these principles, it is possible with relatively little design effort, to transfer the accuracy achievable with CNC machines with only minimum loss to the device and make it available for the user in an advantageous way.

BENEFITS

The advantages achieved with the invention consist in that the presented device can be manufactured with reasonable design effort, yet repeatable high angle accuracy can be achieved efficiently in the processing of sheet material and the device is overall very flexible in use.

Another advantage of the invention is that only very few, partly identical, components must be manufactured precisely; in the simplest configuration the device consists of a work plate, three identical positioning devices, and three also identical, counterparts of the positioning devices (e.g. fitting sleeves); a guide rail and tools are assumed to be available. For other parts of the device such as a frame or base no high accuracies are needed so that these can be manufactured cost effective, possibly even can be made by the end user, e.g. from wood. In particular, the device can also be part of a planning bench.

Furthermore, no calibration of the device is necessary, since the location of the required components to each other is unique.

If a commercial guide rail is to be fixed on the positioning devices, a further advantage is that the common non-slip supports on the bottom side of the guide rail can be resigned which due to their compressibility often lead to angle inaccuracies across the moving direction of the tool.

A further advantage is that the angular resolution is only dependent on the number of holes for the positioning devices. By an appropriate arrangement (see subclaims), for example by a plurality of rows or a matrix in which the holes show different angular increments, with respect to the point by which the guide rail and/or the workpiece can be rotated around, and/or the holes in the individual rows are offset against each other, almost any fine angular resolution can be achieved.

The achievable accuracy is—another benefit—irrespective of the angular resolution as these only depends on the positional accuracy of the holes, the dimensional accuracy of the positioning devices and the tolerance of the fit between the holes in the work plate (or an underlying board) and the positioning devices. In contrast, conventional systems typically offer only very few clearly defined e.g. through locking positions selectable and thus repeatable angle settings which furthermore often lead to—as stated—only relatively inaccurate results. Also the achievable accuracy is independent of the size of the device, i.e. also very large workpieces can be machined with the principle presented with high accuracy; for this it is merely a larger work plate and possibly a longer guide rail needed. In contrast, the achievable angle accuracy of conventional systems while working with larger formats is either low, because with increasing size of the workpieces small angular errors tend to enlarge, or the design effort for the device gets very high.

With split cuts where material shall be cut off from sheet material with a circular saw or with edge processing, it is also of advantage that never too much material can be cut off or removed because the guide rail can not slip beyond the positioning devices but only away from them. So if the guide rail would not be properly positioned, the error could be corrected. This means that the device behaves fault tolerant in some applications.

Furthermore, the surface of the work plate can be damaged by a tool, especially while performing separating cuts without the accuracy of the device would suffer. In case of heavy wear, the work plate which is cheap to manufacture can simply turned over or be replaced.

An additional advantage is that a correctly adjusted machining angle (here: the guide rail is butted against the positioning devices) can easily be made visually recognizable.

When using cylindrical positioning devices a further advantage is that the workpiece or the guide rail touches the positioning devices only along a line but not over an area which again helps to reach a higher accuracy.

Furthermore by using rotatable, irregular shaped or eccentrically mounted positioning devices (8) which can be fixed in their rotation, any intermediate angle or "crooked" angle values (eg 33.7°) can be set repeatable.

It is also advantageous that the holes (4) for the positioning devices (8) or if applicable, additional holes in the work plate can be used for fixing the workpiece (9) e.g. with appropriate holding down devices.

Another advantage is that—assuming that appropriate holes exist—also two guide rails can be used may be even simultaneously, which might be useful if two opposite sides of a workpiece need to be machined.

DRAWINGS

An embodiment of the invention will now be explained based on the drawings. Throughout all of the drawings cylindrical positioning devices and round holes for them are shown—however other, non-circular cross-sections are conceivable as well. Furthermore only a selection of possible holes are shown. Furthermore, no marks/labels are shown for the realizable machining angles realized by the various holes for the positioning devices due to lack of space (drawing scale) however for the device such labels shall be available directly beside the holes in order to allow the user to select the desired machining angle in a fast manner.

FIG. 1 shows the work plate 1 of the device in the plan view with the holes 4 (including 4a to 4c.)—here designed as holes—which are arranged along the rows 5a and 5b, and 6, 6a, 7 and 7a and which can hold the positioning devices 8 (respectively. 8a-8c)—shown here in a cylindrical shape. Thereby the rows 5a and 5b are in parallel to each other and the holes 4 are located exactly opposite to each other whereas row 5a coincides in this example with the baseline 12. In the rows 6, 6a, 7 and 7a the holes lie on arcs of a circle with angular increments of 5 degrees with respect to the base line 12 or rather the positioning device 8b, wherein the holes on the rows 6 and 6a are offset by 2.5 degrees relative to those in the rows 7 and 7a. For row 7 the operationally important intermediate angles of 22.5, 67.5 and 112.5 degrees are drawn (4a, 4b, 4c) in addition. Furthermore, a guide rail 2 is shown which is positioned on the positioning devices and a tool 3 which runs on the guide rail 3 in the direction 3a.

Figure 2:
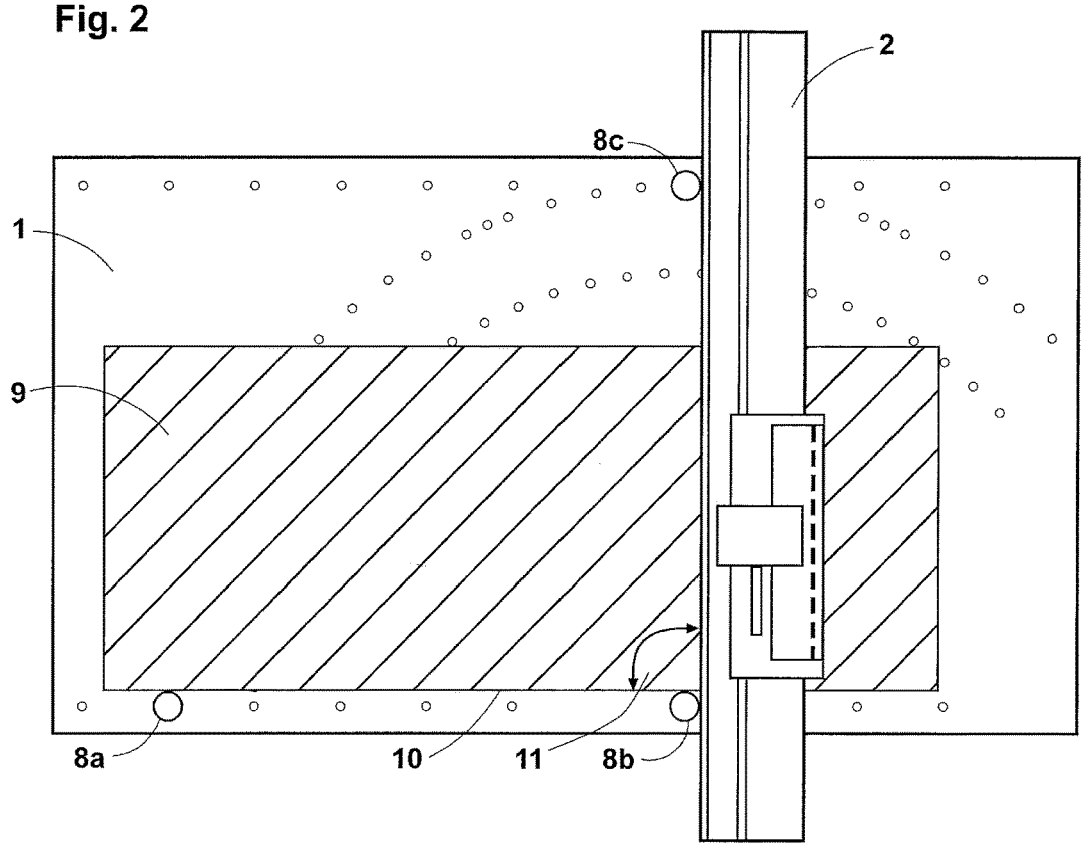

FIG. 2 shows the work plate 1 of the device in plan view and a workpiece 9 placed on the device and positioned at the positioning devices 8a and 8b. Further, a guide rail 2 placed on the workpiece 9 and positioned at the positioning devices 8b and 8c, resulting in a machining angle 11 of 90° between the side 10 of the workpiece 9 and the guide rail 2, (for the sake of clarity this angle is not drawn in the correct position but drawn at the leading edge of the guide rail).

Figure 3:
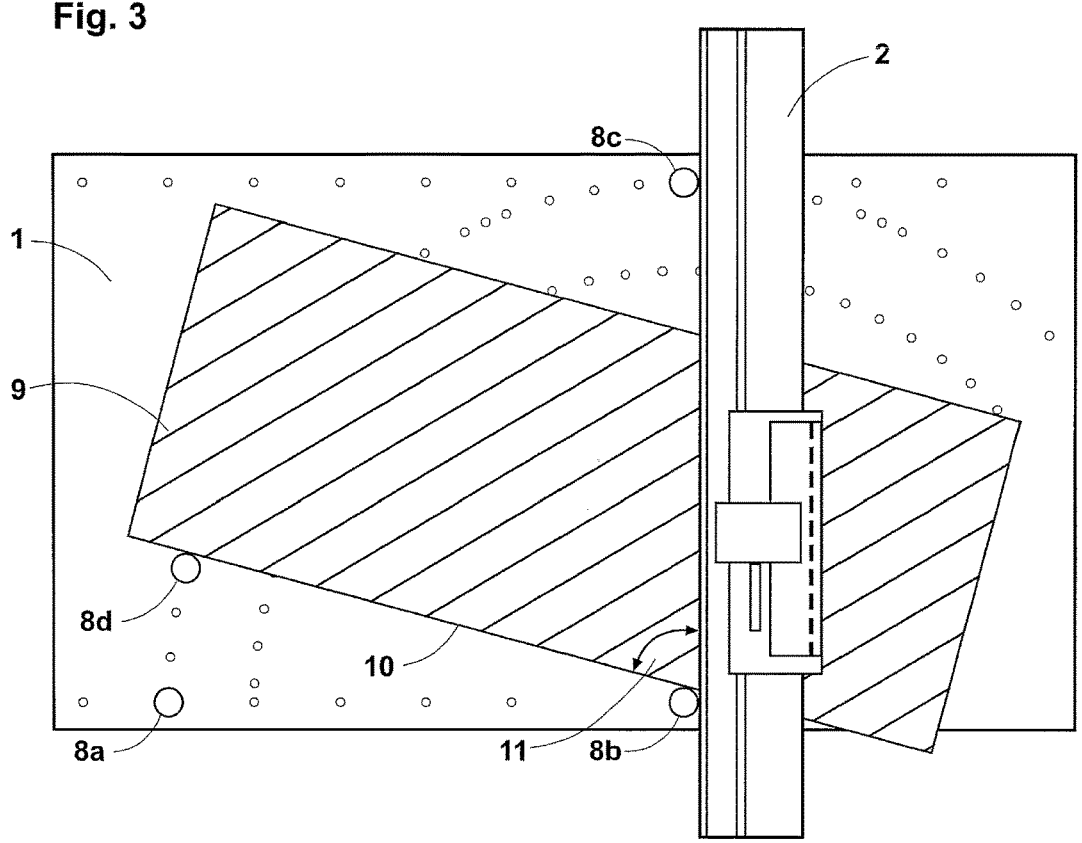

FIG. 3 shows the work plate 1 of the device in plan view, a workpiece 9 placed on the device and positioned at the positioning devices 8a and 8b and a guide rail 2 placed on the workpiece 9 and positioned at the positioning devices 8b and 8c as well as machining angle 11 adjusted thereby to 75° (for the sake of clarity, this is not drawn in the correct position but at the back of the guide rail).

Figure 4:
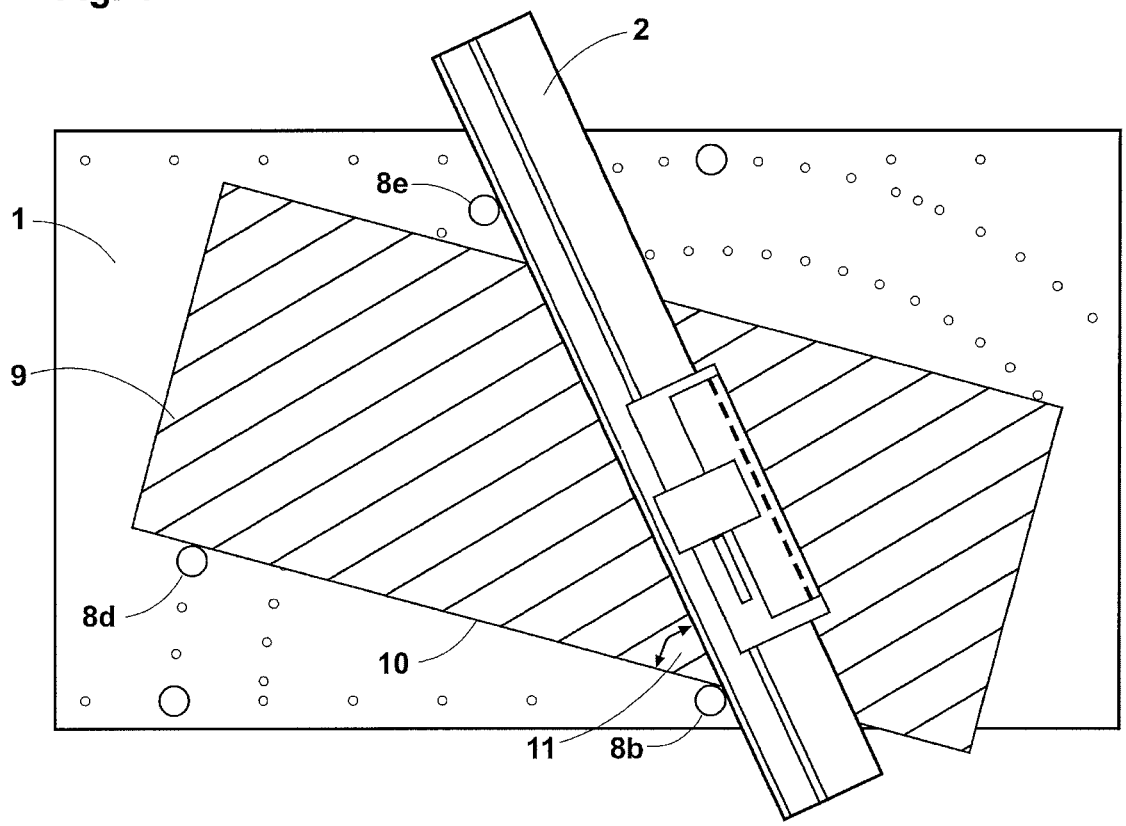

FIG. 4 shows the work plate 1 of the device in plan view, a workpiece 9 placed on the device and positioned at the positioning devices 8a and 8b and a guide rail 2 placed on the workpiece 9 and positioned at the positioning devices 8b and 8e as well as machining angle 11 adjusted thereby to 40° (for the sake of clarity, this is not drawn at the correct position but at the back of the guide rail).

Figure 5:
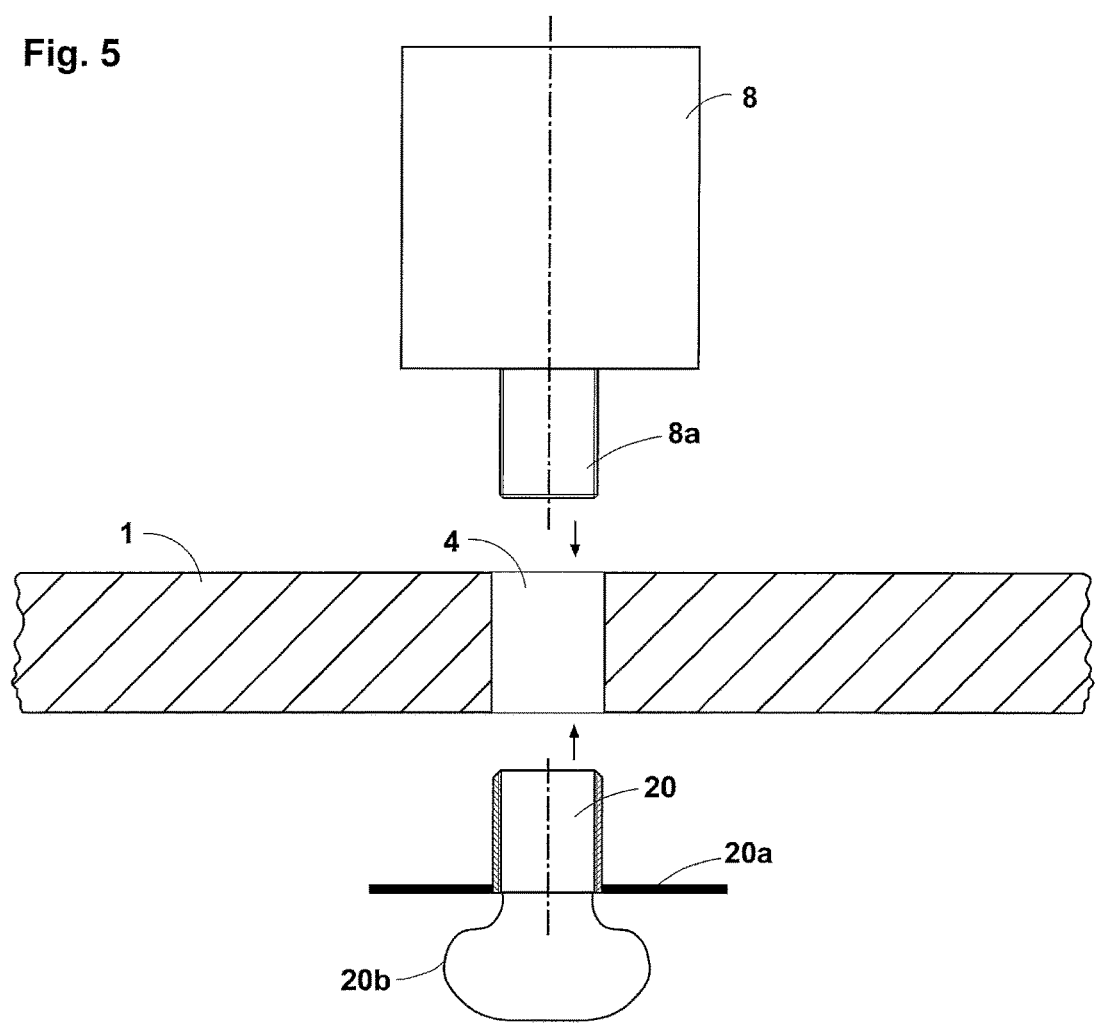

FIG. 5 shows a possible embodiment of the positioning device 8 and one way to connect it with the work plate 1 in a right angle, in correct positional arrangement as well as free of play (sectional view).

Figure 6:
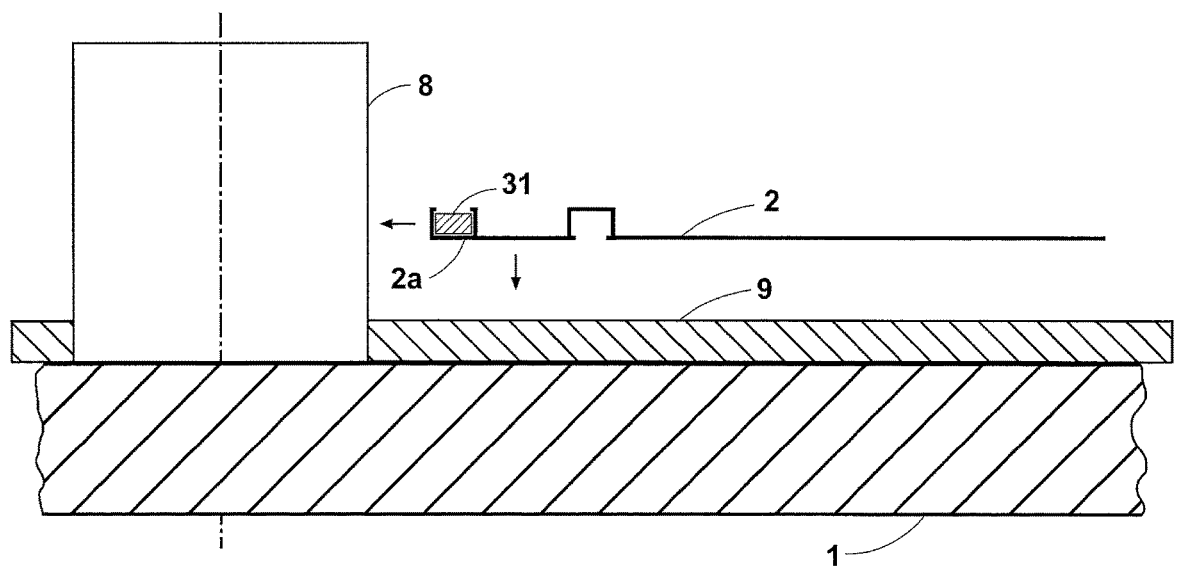

FIG. 6 hows one way of positioning and fixing a commercially available guide rail at the positioning device 8 (sectional view).

THE BASICS

The device is used for the machining of sheet material with tools guided on a guide rail such as a circular saw or router. As shown in FIG. 1, the device essentially consists of a work plate 1 with a defined set of holes 4 (incl. 4a to 4c) in which the positioning devices 8 can be mounted preferably self-centering but in any case in correct positional arrangement. As shown in FIG. 2 the workpiece 9 is then positioned and if applicable fixed with its side 10 to the positioning devices 8 as well as the guide rail 2 with its side averted to the tool as well after it has been placed on the workpiece 9.

Are workpiece 9 and the guide rail 2 oriented at the desired angle to each other, the tool 3 can finally be moved along the guide rail and thus the workpiece 9 can be processed at a precise angle. The holes are made with high precision regarding their position to each other for example by means of a CNC milling machine and lead, together with the precisely dimensioned positioning devices 8 as well as the workpiece 9 and the guide rail 2 positioned free of play to them the desired high angular accuracy. From the description above it is obvious that the work plate 1 must be made of low-warpage material or material which warps homogeneously.

With extreme accuracy requirements, the variation with two superimposed boards is therefore recommended at which the top board is only used as a work surface that can be damaged by the tools and which in this case does not necessarily has to be non warping and the lower board is made from nonwarping material and is used to mount the positioning devices 8 in correct positional arrangement. In this case, the holes 4, are to be formed slightly larger in the upper board so that the material can warp according to changes in temperature and/or humidity without influencing the location of the positioning devices 8.

POSITIONING/FIXATION

For machining a workpiece, the workpiece 9 and the guide rail 2 need to be positioned and if applicable fixed at least at two points or positioning devices 8 each, whereas one of these points 8b can be used both for positioning of the workpiece 9 and the guide rail 2, making a total of three positioning devices 8 sufficient. Thereby a fixation of the workpiece 9 can be realized with conventional holding-down devices which are mounted in the holes 4 of the work plate intended for the positioning devices or additional holes which are not shown in the drawings.

A fixation of the workpiece by vacuum is conceivable as well; for this the holes 4 for the positioning devices 8 or those ones for the holding-down devices or additional holes could be used. A fixation of the guide rail 2 can for example be realized by means of ferromagnetic forces (see below).

SETTING THE MACHINING ANGLE

The machining angle 11, i.e. the angle between the guide rail 2 and the side 10 of the workpiece 9, can be adjusted and varied by mounting the positioning devices in the different holes 4. For a machining angle 11 of 90° two parallel rows 5a and 5b of holes 4 for the positioning 8 devices exist as shown in FIG. 1, whereas the holes 4 in the both rows are opposite to each other. If, as shown in FIG. 2, the workpiece 9 is positioned at the positioning devices 8a and 8b and the guide rail 2 is positioned on the positioning devices 8b and 8c, a machining angle 11 of 90° is set.

Thereby the workpiece 9 could also be positioned at additional or other positioning devices mounted in one of the rows 5a or 5b or other parallel rows (not shown in the drawing).

In order to realize a machining angle 11 smaller or larger than 90° one of the positioning devices 8 is mounted in one of the other holes 4 along the rows 6, 6a, 7 and 7a, and according to the desired machining angle 11. On this and on the positioning device 8b the workpiece can then be positioned. FIG. 3 shows an example of a machining angle 11 set to 75 degrees, which results from rotation of the workpiece around the positioning device 8b and a positioning of the workpiece on this and on the positioning 8d. Additionally, the guide rail 2 can also be rotated around the positioning device 8b. For this, an additional positioning device 8e is mounted along one of the rows 6, 6a, 7 and 7a depending on the desired machining angles and according to the size of the workpiece. FIG. 4 shows an appropriate machining angle 11 of 40 degrees which results from rotation of the workpiece and the guide rail around the positioning device 8b.

The use of multiple rows with the holes 4, e.g. arranged in parallel rows and for example being arc-shaped with respect to the positioning device 8b, allows for a finer gradation of angular increments i.e. by the fact that these have different angular increments (in relation to the positioning device 8b) respectively are offset against each other. In the example shown in FIG. 1 the rows 6 and 6a allow for setting machining angles of 7.5-12.5-17.5 . . . degree etc. and the rows 7 and 7a machining angles of 10-15-20 . . . degree etc. in relation to the baseline 12 respectively to the positioning device 8b so that by using one or the other row, machining angles with 2.5 degree distance (or: angular resolution) can be realized. In addition, the various rows can be used to optimal support differently sized workpieces with the highest possible distance of the positioning devices. Depending on the size of the holes these angle increments might be not possible with a single row of holes. An even finer angular resolution (e.g. 1 degree spacing) can be easily achieved with additional holes or rows.

Additive or alternative positioning devices of different diameters can be used to further subdivide the angle increments which result from the position of the positioning devices 4 relative to the positioning device 8b. Also the usage of eccentrically pivoted or elliptically shaped positioning devices is possible for this purpose, whereas these may alternatively also be used for clamping the workpiece 9.

MOUNTING THE POSITIONING DEVICES

The positioning devices 8 can be mounted in the work plate 1, for example such as shown in FIG. 5. For that purpose a sleeve 20 with an appropriate selected internal thread is mounted e.g. with a slight press-fit into the work plate 1 from below. Through a large contact surface 20a of the sleeve 20 a rectangular orientation of the sleeve is achieved with the work plate 1. The positioning device 8, which is provided with an external thread 8a at its lower end, is mounted into the work plate 1 from above and bolted together with the sleeve 20 in a right angle to the work plate 1 and free-of-play. In order to achieve a sufficient torque, the sleeve 20 is provided in the embodiment with a knob 20b.

FIXING THE GUIDE RAIL

The guide rail 2 can be fixed to the positioning devices 8 for example, as shown in FIG. 6. Subsequently, the guide rail 2 is placed on the workpiece 9, and positioned at the positioning devices with the outer edge of the groove 2a. In order to fix this position, a strong permanent magnet is located in the outer groove 2a of the (conventional) guide rail and fixed with set screws if applicable (not shown). The positioning device 8 is made of ferrous material or provided with an electromagnet whereby a sufficient ferro magnetic holding force is produced with which the guide rail 2 is fixed to the positioning device 8. As no large forces occur across the movement direction of the tool while working e.g. with a circular saw or router no specifically large holding forces are needed. Another possibility is to equip the positioning devices 8 with appropriate clamps which for example intervene in the outer groove 2a of the guide rail 2 and draw the guide rail towards the positioning devices 8. In both cases, it is also conceivable that the positioning devices 8 are equipped with integrated holding-down-devices, which firmly press the guide rail on the workpiece 9 (not shown).

The invention claimed is:

1. A device for the machining of a workpiece by a hand-operated tool guided along a guide rail, the device comprising:
   at least a work-plate, a guide rail configured to mount the hand-operated tool thereon, and a set of at least three position devices, wherein the work-plate comprises a plurality of holes and is configured to mount said at least three position devices substantially free of play at least partially within the plurality of holes in the work-plate,
   wherein a first position device of the at least three position devices is received in a first hole of the plurality of holes, a second position device of the at least three position devices is received in a second hole of the plurality of holes, and a third position device of the at least three position devices is received in a third hole of the plurality of holes;
   wherein the first and the second position device of the at least three position devices are in direct contact and abutting an outer edge of the guide rail such that a position of the guide rail is defined; and wherein the second position device and the third position device of the at least three position devices or the third and a fourth position device are configured for direct contact with an outer edge of the workpiece such that a position of the workpiece is defined;
   whereas the locations of the first, second, and third holes define a definite and reproducible machining angle between the guide rail and the outer edge of the workpiece;
   whereas the first, second, and third position devices can be located in respective ones of the plurality of holes to select the reproducible machining angle, said machining angle being one of a plurality of preset machining angles that includes 45 degrees, 90 degrees, and at least one angle therebetween;
   whereas the machining angle can be varied by relocating at least one position device of the set of at least three position devices by using a fourth hole or by using at least one position device of the set of at least three position devices of a different dimension or shape or by using rotatable position devices which are lockable in rotation and are out-of-round shaped or mounted eccentrically.

2. Device according to claim 1, characterized in that the device consists of two superposed plates, or a plate and a structure of suitable material, wherein an upper plate of the two superposed plates or a plate and a structure is used as a work surface and configured to be damaged by the use of the tool guided on the guide rail without impairing the function of the device or damaging the tool and a lower plate or structure of the two superposed plates or a plate and a structure is used to mount the at least three position devices through holes in the upper plate in a correct positional arrangement and wherein the upper plate is separable from the lower plate and replaced easily or mounted upside down.

3. Device according to claim 2, characterized in that the plurality of holes in the work plate comprises a plurality of holes in the upper work plate and the lower plate or structure; the plurality of holes in the upper work plate and the lower plate or structure comprises at least one central hole and are arranged in a matrix or in different rows or sequences of holes with adjacent holes in each row or sequence of holes being spaced apart a fixed intermediate angle with respect to the central hole, wherein an angle relative to the central hole between a first hole of the row or sequence of holes and a second hole of the row or sequence of holes adjacent to the first hole of the row or sequence of holes is the same as an angle relative to the central hole between the second hole of the row or sequence of holes and a third hole of the row or sequence of holes adjacent to the second hole of the row or sequence of holes, said angles being smaller than 45°, said angles being configured to be different or equal from a first row or sequence of holes to a second row or sequence of holes, wherein the holes in a third row or sequence of holes are configured to be offset from a fourth row or sequence of holes, wherein at least the guide rail or the workpiece are positioned on, and are rotatably arrangeable in a plane of the workpiece around, the first position device of the set of at least three position devices mounted in the at least one central hole and is respectively positioned to another position device of the set of at least three position devices mounted in the second hole of the at least one row or sequence of three holes, wherein the workpiece is particularly rotatable around and in respect to the at least one central hole in a different angular increment than the guide rail.

4. Device according to claim 3, characterized in that the guide rail is connected at one point with the first position device of the set of at least three position devices mounted in the central hole via a suitable roller bearing or slide bearing in such a way that the connection is without play but the guide rail is pivotable around the first position device mounted in the central hole and configured to be adjustable in height at the same time.

5. Device according to claim 2, characterized in that the upper and the lower plate of the device consist of additional holes superposed with respect to one another in which clamping elements or holding-down devices are mountable in order to fix at least one of the work piece or the guide rail on the work-plate wherein said additional holes or a selection of holes in the work-plate in general are configured to fix the workpiece (9) by suction of air.

6. Device according to claim 2, characterized in that at least two of the set of at least three position devices are mounted in a definite and rectangular manner and free from play from a top side of the upper plate through the holes of the upper plate into appropriate counter parts inside the lower plate or structure where only the lower plate or structure defines a position of the at least two of the at least three position devices.

7. Device according to claim 2, characterized in that the device contains at least one clamping mechanism which is configured to be attached at the guide rail and to pull the guide rail towards at least one of the at least three position devices until the guide rail touches said at least one of the at least three position devices and configured to then fix this position of the guide rail.

8. Device according to claim 2, characterized in that the guide rail is fixable in position by magnetic force established between at least one position device of the set of at least three position devices and the guide rail.

9. Device according to claims 2, characterized in that the guide rail is connected at one point with the first position device of the set of at least three position devices mounted in a central hole via a suitable roller bearing or slide bearing in such a way that the connection is without play but the guide rail is pivotable around the first position device mounted in the central hole and configured to be adjustable in height at the same time.

10. Device according to claim 2, characterized in that the device comprises a base, wherein the base is at least foldable or adjustable in height.

11. Device according to claim 1, characterized in that the plurality of holes in the work plate comprises at least one central hole and are arranged in a matrix or in different rows or sequences of holes with adjacent holes in each row or sequence of holes being spaced apart a fixed intermediate angle with respect to the central hole, wherein an angle relative to the central hole between a first hole of the row or sequence of holes and a second hole of the row or sequence of holes adjacent to the first hole of the row or sequence of holes is the same as an angle relative to the central hole between the second hole of the row or sequence of holes and a third hole of the row or sequence of holes adjacent to the second hole of the row or sequence of holes, said angles being smaller than 45°, said angles being configured to be different or equal from a first row or sequence of holes to a second row or sequence of holes, wherein the holes in a third row or sequence of holes are configured to be offset from a fourth row or sequence of holes, wherein at least the guide rail or the workpiece are positioned on, and are rotatably arrangeable in a plane of the workpiece around, the first position device of the set of at least three position devices mounted in the at least one central hole and is respectively positioned to another position device of the set of at least three position devices mounted in the second hole of the at least one row or sequence of three holes, wherein the workpiece is particularly rotatable around and in respect to the at least one central hole in a different angular increment than the guide rail.

12. Device according to claim 11, characterized in that the guide rail is connected at one point with the first position device of the set of at least three position devices mounted in the central hole via a suitable roller bearing or slide bearing in such a way that the connection is without play but the guide rail is pivotable around the first position device mounted in the central hole and configured to be adjustable in height at the same time.

13. Device according to claim 11 or claim 3 wherein at least one row or sequence of holes comprises a plurality of rows or sequences of holes, wherein the intermediate angle in at least one row or sequence of holes is 1 degrees or 22.5 degrees or 30 degrees or another value which can be derived by dividing 90 degrees by whole numbers.

14. Device according to claim 1, characterized in that the work-plate consists of additional holes in which clamping elements or holding-down devices are mountable in order to fix at least one of the work piece or the guide rail on the work-plate wherein said additional holes or a selection of holes in the work-plate in general are configured to fix the workpiece on the work-plate by suction of air.

15. Device according to claim 1, characterized in that the device contains fitting sleeves which are mounted rectangularly and free from play in the plurality of holes of the work-plate configured to mount the at least three position devices in the fitting sleeves free from play in a definite and rectangular manner from an upper side of the work-plate while the fitting sleeves cannot be damaged or impaired in function by the use of the tool guided on the guide rail.

16. Device according to claim 1, characterized in that the device contains at least one clamping mechanism which is configured to be attached at the guide rail and to pull the guide rail towards at least one of the at least three position devices until the guide rail touches said at least one of the at least three position devices and configured to then fix this position of the guide rail.

17. Device according to claim 1, characterized in that the guide rail is fixable in position by magnetic force established between at least one position device of the set of at least three position devices and the guide rail.

18. Device according to claim 1, characterized in that the device comprises a base, wherein this base is at least foldable or adjustable in height.

19. A device for machining a workpiece by at least one type of tool, the tool being a router or circular saw, the tool being exchangeable and guided on a longitudinal axis of a guide rail, the device comprising: a work-plate having a plurality of holes therein; a guide rail configured to mount the tool thereon, the guide rail having a first end and second end, the guide rail having at least one magnet fully received in a longitudinal groove located along a side of the guide rail; at least one position device positioned at least partially within a hole of the plurality of holes in the work-plate and configured for direct contact and abutting an outer edge of the guide rail such that a position of the guide rail is defined; the at least one position device being made of a ferrous material or provided with an electromagnet;
wherein the work-plate and the at least one position device are configured to be mounted at a work bench, wherein the guide rail is configured to guide a cutting edge of said tool at or behind one edge of the guide rail while an opposite edge of the guide rail is configured to be positioned at, and establishing a mechanical contact with the at least one position device, and wherein the mechanical contact is maintained in at least one direction during operation of the tool guided on the guide rail by magnetic forces established between the guide rail and the at least one position device.

* * * * *